Patented May 1, 1945

2,374,966

UNITED STATES PATENT OFFICE 2,374,966

LUBRICATING GREASE COMPOSITION

John C. Zimmer, Union, and Arnold J. Morway, Rahway, N. J., assignors to Standard Oil Development Company, a corporation of Delaware No Drawing. Application December 24, 1941, Serial No. 424,270

7 Claims. (Cl. 252—37)

This invention relates to lubricants for machinery functioning under conditions of local high temperature increases, of irregular and shock load effects oftentimes occurring when the machinery is exposed to a sandy, muddy or water-drenching environment, and of frictional forces beyond the film strength of any lubricating oil base material. The invention relates more specifically to semi-fluid grease compositions adapted for the lubrication of industrial machinery, chassis parts of automobiles and crawler-type tractors; and their preparation.

The ingredients of a lubricating grease are not the sole determinants of its quality: the physical and chemical relationships of the ingredients within the composition determine, to a very large extent, the service characteristics. A composition to be suitable as a lubricating grease for machinery of the type of automobile chassis and crawler-type tractors, must form an unusually cohesive and adhesive film by flowing largely under its own weight to the bearing surfaces in a moisture pervading atmosphere and the film so formed must be capable of withstanding sudden loads and shocks as occur in service. It is also essential that the grease compositions be cleanly dispensable at commercial outlets from grease gun equipment, that is, that the composition must be of suitable consistency to be thus handled and not unduly stringy in nature to cause a messy lubrication job. It is an object of this invention to make available and prepare a grease composition admirably suitable for the lubrication of machinery such as automobile chassis and crawler-type tractors, that is, to prepare a composition which has, in a highly satisfactory degree, the properties of a desirable lubricant for such type equipment as well as industrial machinery.

It is well known that the aluminum soaps of the higher molecular weight saturated fatty acids, such as aluminum stearate, when incorporated in a mineral oil of lubricating oil range have the tendency to set to a solid gel and that to prepare suitable grease compositions it is essential to cool the mixture of oil and aluminum soap after mixing very slowly and in thin layers according to the method of pan cooling. On the other hand, the aluminum soaps of the naphthenic acids, when incorporated in mineral oils, tend to form highly viscous composites of ropey, cohesive and rubbery nature largely irrespective of the manner of cooling after mixing. In the prior art, it has been found that by suitably adjusting the amounts of aluminum stearate and aluminum naphthenate in a mineral oil, a composite is prepared which has properties relatively satisfactory from the points of view of adhesiveness, cohesiveness and consistency characteristics and the composites can be cooled rapidly without disadvantage. When an oil thickening agent is incorporated in the blend, increased adhesiveness is imparted to the mixture.

It has now been found that by incorporating an organic amine compound in a mixture of mineral oil, an oil thickening agent such as polyisobutylene, aluminum soaps of the higher fatty acids, such as aluminum stearate, and aluminum naphthenate, important effects upon structural characteristics of the composite are noticeable. One of these effects is that by the addition of amine the composite may be cooled rapidly to a lower temperature than in its absence, without disadvantage. The other newly discovered effect is that many of the undesirable characteristics of the various individual additives to the mineral oil base are eliminated or desirably reduced without disadvantageously impairing the particularly desirable characteristics of the additive compounds. Thus, by incorporating an organic amine in suitable quantities in a mineral oil in which soaps, such as aluminum stearate and aluminum napthenate and thickener such as polyisobutylene are blended, attention can largely be directed to the desirable characteristics of these latter additives and less attention than previously to their undesirable characteristics. A particularly advantageous effect of the incorporation of aluminum naphthenate in grease compositions not disadvantageously affected by the presence of the organic amine, is the ability of preparing the gel type of grease composition by methods of quick cooling and thus eliminating the need for the costly and laborious process for preparing aluminum soap greases by pan cooling. Also, the organic amines have no disadvantageous effect upon the incorporation in grease compositions of compounds such as oleic and stearic acids to improve the stability of grease compositions upon storage.

Thus, the present invention is concerned with the preparation by either slow or rapid cooling of aluminum soap grease compositions containing as additives to a suitable mineral oil base, an aluminum soap of a saturated fatty acid containing between ten and twenty carbon atoms in the molecule and particularly those containing between 16 and 20 carbon atoms, such as aluminum stearate and an organic amine in an amount based upon the amount of the mineral oil base of between about 0.05% to 3% by weight. Present in the grease composites may or may not be aluminum oleate or naphthenate. An oil thickening agent such as polyisobutylene and a storage stabilizing agent such as oleic or stearic acid are often blended in the composites to impart special characteristics. The amount in which the aluminum soap of the higher saturated fatty acid is present varies usually from about 3% to 10% by weight of the oil. Aluminum oleate or naphthenate when incorporated in the composition are added usually in an amount varying between ⅕ and 1/10 of the amount of the aluminum soap of the saturated fatty acid. Preferred constituents of the grease compositions of the invention are aluminum stearate in amounts between 3% and 8%; the aluminum soap derivatives from petroleum naphthenic acids in amounts between 0.25% and 2% by weight and an organic amine in an amount between 0.10% and 1.5% selected from the class of aliphatic amines, particularly the hydroxy amines, the saturated cyclo-aliphatic amines, hydroxy-amines, and the aromatic amines of bi-nuclear structure. Of the various organic amines that can be advantageously incorporated in grease compositions, special mention may be made of the effects of toluidine, alpha-naphthylamine, beta-naphthylamine, diphenylamine, dicyclohexylamine, dicyclohexanolamine and triethanolamine.

The presence of organic amines in the grease compositions of the invention apparently affects structural characteristics of the composition rather than exerting any antioxidation effects. It would seem that the organic amines exert a physical stabilizing effect in the finished grease preparations, as well as repressing the extreme gelling characteristics of the aluminum soaps of the saturated fatty acids and the extreme cohesive and rubbery characteristics of other type aluminum soaps in mineral oil solution. The exact nature of the effect is not understood but it is presumably a soap crystallization modifier in regard to properties exerted in an extreme degree.

In preparing the grease compositions of this invention the oil employed is preferably derived from a naphthene base crude as, for example, oils of the Coastal type. The viscosity of the oil is usually above about 85 seconds Saybolt at 210° F. particularly from 75 to 220 and preferably from 160 to 180 seconds Saybolt at 210° F. The aluminum soaps and the mineral oil are mixed together at ambient temperatures and then heated. During the heating the mixture is stirred and the organic amine is added at a temperature of between 280° F. and 300° F. to obtain a relatively homogeneous mixture. The heating is effected in the usual type heating kettle. When a commercial sample of aluminum naphthenate is employed, it may be preferable to add the aluminum naphthenate to the oil and to heat the mixture to a temperature of between 250° F. and 350° F. while stirring in order to remove any water associated with commercial aluminum naphthenate, and then to add the other constituents to the mixture. The heating kettle is usually furnished with a paddle device having close fitting scrapers to insure thorough mixing and good heat transfer. The paddle usually has small steel fittings attached to the outer edge of the sweep which are kept at close scraping adjustment by means of adjusting screws. Usually the soap additives to the mineral oil are blended with about 10% to 20% of the total quantity of the oil to be used and the ingredients are worked together in a thick paste. The paste is then stirred into the balance of the oil which is heated to a temperature of between 280° F. and 350° F. and held at that temperature until all of the soap is thoroughly incorporated into a smooth homogeneous mixture.

The mass, after heating in the kettle, is then rapidly cooled by passing through cooling equipment to a temperature of about, or slightly below, the transition point, usually about 100° F. but sometimes as low as 80° F. for effecting change from being a stringy liquid to a consistency of a solid adhesive cohesive gel. The cooling may be effected by the pan cooling procedure of the prior art, or in any type of jacketed equipment of the pipe or tower, or preferably, a helical screw conveyor type. While the grease material is being cooled to about transition temperature, the mass is agitated. When the temperature of about transition is reached, agitation is discontinued, and the mass allowed to cool further in order to permit the desirable change in texture of the mixture to occur. Usually the mixture may be filled directly into the shipping containers after cooling to prevailing atmospheric while agitating and allowing the change from a rubbery product to a gel grease structure to occur therein.

The rate at which the mass may be cooled from the temperature of complete dispersion of the soaps in the oil and the temperature to which the mass may be cooled are determined by the amounts of the soap of the saturated fatty acid and organic amine present and any aluminum oleate or naphthenate that may be present. During the cooling the transition in structure occurs from being a very rubbery cohesive mass to that of a smooth gel. In the absence of the amine and the oleate or naphthenate compounds the transition temperature for a mineral oil-aluminum stearate composite is between 160° F. and 170° F. and with quick cooling the aluminum stearate tends to crystallize with a resultant hard grainy gel structure. A smooth satisfactory gel structure may occur when the sole additive to a mineral oil is aluminum stearate above about 3% concentration only when the composite is cooled in thin layers from temperatures of about 200° F. to prevailing atmospheric temperatures without agitation.

In mixing aluminum naphthenate with the aluminum soap of the saturated fatty acid such as aluminum stearate, in an amount of about 10% by weight, the tendency of the aluminum soap of the saturated fatty acid to set upon cooling, is inhibited to an appreciable degree. The amount in which the naphthenate soap is admixed with the stearate soap determines which of the characteristics predominates, that is, whether the composite, after cooling, is a smooth stringy gel, or a highly cohesive rubbery semifluid mass of poor adhesive characteristics. The amounts in which the two soaps are admixed may be determined by the need for preparing a composition of soft or hard consistency without having the disadvantageous effect of being either too stringy or rubbery in character.

A grease so prepared can be dispensed readily from a gun of the ordinary type available at commercial outlets at temperatures as low as 10° F. At the same time, the grease composition is possessed of a high degree of adhesiveness to metallic surfaces. The grease composition may contain as non-essential ingredients oil thickeners such as polymers or olefins especially of the iso-olefins and particularly of the isobutylenes and the isoamylenes. For this purpose the polymers having molecular weights of 30,000 and 200,000 are preferred and they are ordinarily used in amounts from about 0.05% to 0.25%, depending upon the molecular weight of the polymer employed. Oxidation inhibitors of various types may be added to the oil as well as dyes, anti-corrosion or extreme pressure agents and the like which may be employed to impart other desirable characteristics.

Example I

A composition of formula in weight percentages

|  | Per cent |
|---|---|
| Aluminum stearate | 7.0 |
| Aluminum naphthenate | 0.5 |
| Polybutene mineral oil concentrate (6% polybutene concentration of over 30,000 molecular weight) | 1.0 |
| Triethanolamine | 0.1 |
| Low cold test mineral oils (85 vis./210° F.) | 91.4 | is prepared as follows:

The aluminum stearate and 20% of the mineral oil are charged to a heating kettle and stirred to obtain a smooth, non-lumpy paste. Heating is then commenced and the balance of the mineral oil is charged to the kettle. The temperature is raised to 280° F. and then the aluminum naphthenate is added. The temperature is then raised to 300° F. and held thereat until a clear non-lumpy fluid homogeneous grease mass is formed. The amine and oil solution of polybutene is added and the grease is then cooled by passing cold water through the kettle jacket, or pumped through a screw cooler to a temperature just below the transition point of approximately 100° F. When this temperature is reached agitation is discontinued in the kettle and the mass allowed to cool further after charging to shipping containers. In the screw cooler the grease is recirculated to the kettle and allowed to cool without further agitation or packaged directly from the cooler.

Example II

A composition of formula in weight percentages

|  | Per cent |
|---|---|
| Aluminum stearate | 8.0 |
| Dicyclohexylamine | 0.8 |
| Polybutene mineral oil concentrate | 1.0 |
| Low cold test mineral oil 150 seconds Saybolt at 210° F | 90.2 | is prepared as follows:

The aluminum stearate and 20% of the oil is mixed to a smooth paste in the kettle equipped with scraper paddles. Heating an addition of the balance of the oil is started and the temperature raised to 280° F. The dicyclohexylamine and the oil solution of polybutene are added and cooling commenced by passing the hot grease into a cold water jacketed helical screw chiller-conveyor. The grease is cooled to 100° F., in one pass, and packaged directly from the chiller.

This grease is of smooth consistency having an A. S. T. M. penetration of 250 and a worked penetration of 330 at 77° F.

Example III

A composition of formula in weight percentage:

|  | Per cent |
|---|---|
| Aluminum stearate | 6.50 |
| Alphanaphthylamine | 0.80 |
| 200 seconds Saybolt viscosity mineral oil of low cold test | 14.00 |
| Polybutene mineral concentrate (6% polybutene concentration of over 30,000 molecular weight) | 0.25 |
| 70 seconds Saybolt viscosity mineral oil of low cold test | 78.45 | is prepared as follows:

The high viscosity mineral oil and the aluminum stearate are charged to a steam jacketed heating kettle and stirred to obtain a smooth non-lumpy paste. The low viscosity oil is added and heated to a temperature of 280°/300° F. At this temperature the polybutene concentrate and alphanaphthylamine are added and stirring continued for a short period after heating is discontinued. The mass is then passed through a screw scraper cooler at a rate to cool the mass to a temperature of between 90°/95° F., and then passed directly into shipping containers. The transition from a stringy semi-fluid product to a smooth gel is allowed to occur in the shipping containers. The product after 24 hours is a smooth, homogeneous plastic transparent grease, having an A. S. T. M. unworked penetration of 270 and an A. S. T. M. worked penetration of 340

Example IV

A composition of formula in weight percentage:

|  | Per cent |
|---|---|
| Aluminum stearate | 8.0 |
| Toluidine | 1.0 |
| Latex | 0.5 |
| Low cold test mineral oil (170 seconds Saybolt viscosity at 210° F.) | 90.5 |

Method of preparation was essentially that given for the composition as previously described in other examples.

The invention has been described generally and in terms of specific embodiments. It is to be understood that the invention is not confined to the actual description given since there may be made changes and modifications defining any significant departure of the salient features of the invention as expressed in the appended claims.

What is claimed:

1. A non-cohesive lubricating grease highly adhesive to metal surfaces for the chassis parts of automobiles and crawler-type tractors comprising a mineral oil having a viscosity of from 160 to 180 seconds Saybolt at 210° F., about 3% to 8% of aluminum stearate, about 0.25% to 1.5% of aluminum naphthenate, and 0.05 to 1% of an organic amine, the same being worked into a smooth, substantially transparent homogeneous semi-fluid grease having a penetration of between 300 and 400 at 77° F.

2. A lubricating grease according to claim 1 in which the organic amine is dicyclohexyamine in an amount of about 0.8%.

3. A lubricating grease according to claim 1 in which the organic amine is alphanaphthylamine in an amount of about 1.0%.

4. Process for preparing aluminum soap greases which comprises thoroughly mixing at a temperature between 280° F. and 300° F. a viscous mineral lubricating oil, between about 3% and 10% aluminum stearate and between about 0.5% and 1% of an organic amine, rapidly cooling the heated mixture to a temperature below about 140° F. in a flowing stream and allowing the cooled mass to stand.

5. Process according to claim 4 in which the organic amine is an aliphatic amine.

6. Process according to claim 4 in which the organic amine is a cyclo-aliphatic amine.

7. Process according to claim 4 in which the organic amine is an aromatic amine of condensed bi-nuclear structure.

JOHN C. ZIMMER.
ARNOLD J. MORWAY.